May 10, 1966  M. L. MARKS  3,250,981
VOLTAGE REGULATOR
Filed Feb. 5, 1962  2 Sheets-Sheet 2

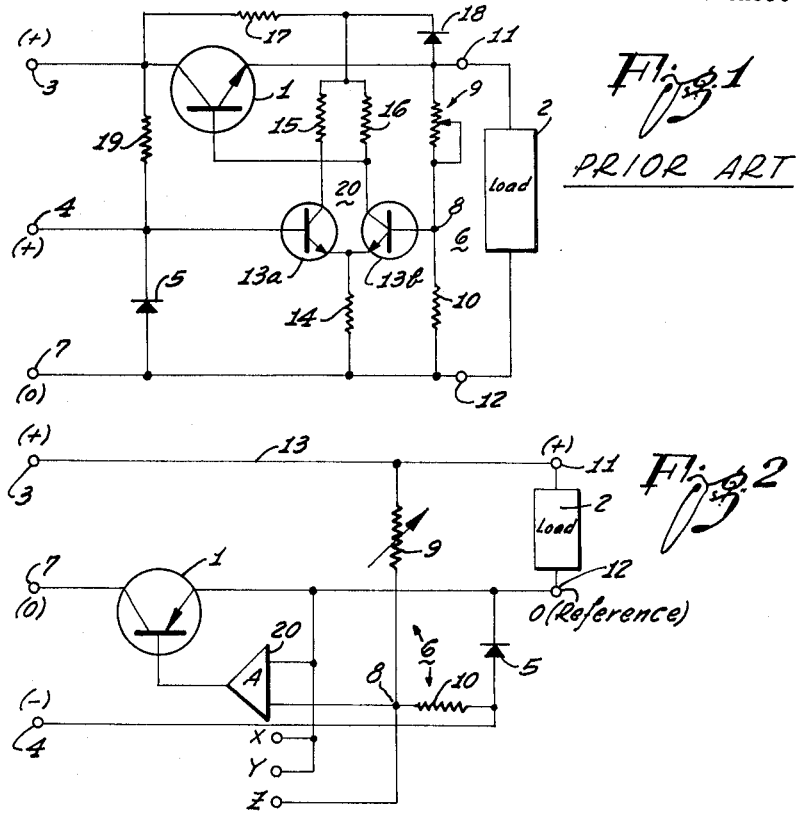

INVENTOR:
Monte L. Marks
Attorneys

United States Patent Office 3,250,981
Patented May 10, 1966

3,250,981
VOLTAGE REGULATOR
Monte L. Marks, 1247 E. Palm, Altadena, Calif.
Filed Feb. 5, 1962, Ser. No. 171,049
15 Claims. (Cl. 323—22)

This invention pertains to regulated, direct-current power supplies of the type which utilize a comparison between a portion of the output voltage of the power supply and the constant reference voltage to develop an error potential having the polarity and magnitude required to compensate fluctuations of output voltage or current with respect to a pre-adjusted regulation level.

In general, a power supply in accordance with this invention utilizes a variable-impedance device coupled in series with a load element across input terminals connected to a source of direct current power. The impedance of the variable-impedance device is increased or decreased sufficiently to maintain the power-supply output at a predetermined constant magnitude notwithstanding load-impedance variations, input-voltage fluctuations, or other changes in operating conditions. To accomplish this objective, the impedance of the variable-impedance device is controlled by an error signal representing any change of the instantaneous output voltage or current from the predetermined constant magnitude.

The error signal is produced by comparing a reference potential developed at the output of the variable-impedance device with an output-representative potential. To produce the latter potential, a constant-voltage source is coupled effectively to the output of the variable-impedance device to provide a voltage outside the range of the power-supply output, and a fixed resistor and a potentiometer are coupled in series from the constant-voltage source to the opposite output terminal of the power supply. The output-representative voltage is developed across the fixed resistor. Hence, if the power-supply output is at the correct magnitude, the error voltage is zero because the voltage developed across the fixed resistor will be equal and opposite to that of the constant-voltage source. If the power supply output is too high, or too low, the voltage developed across the fixed resistor will differ from that of the constant-voltage source. These differing potentials, when applied as inputs to a differential amplifier, will produce an error signal of appropriate polarity and magnitude to change the impedance of the variable-impedance device in the direction required to counteract the error in the power-supply output, and again equalize the reference and output-representative potentials.

In a manner explained more fully below, the ingenious circuitry outlined above for developing an error signal results in many important improvements over regulated power supplies known to the prior art. For example, this invention makes it possible to provide for the first time a stable power supply wherein the regulated output voltage or current can be adjusted to any value within a range extending from zero to the design maximum of the power supply circuit without causing any variations whatever in the input, output, or internal operating conditions of the differential amplifier. In addition, the power supply of this invention is responsive to error signals on the order of millivolts, for example, to stabilize output voltage or current to a preadjusted level within a range extending from zero to a maximum on the order of several hundred volts. The upper limit of this range depends only on the magnitude of the input voltage or current, and the performance ratings of available components for the regulating transistor and the potentiometer. Accordingly, the problem of immunizing the error-signal generating circuitry from the adverse effects of ambient temperature fluctuations is minimized. This important feature contrasts sharply with many prior art power supplies which require error-signal fluctuations determined by the preadjusted level of the output, and normally on the order of several volts. In these conventional circuits, immunization of the circuitry from the effects of changes in ambient temperature is a substantial and sometimes insoluble problem.

Furthermore, the maximum regulated voltage or current may be increased merely by replacing the potentiometer and the variable-impedance device with similar components of higher rating. This extraordinary flexibility is made possible because the novel error-signal generating circuitry insures that the reference potential and the output-representative potential remain effectively equal and constant notwithstanding an increase in input voltage to the power supply, changes in the ratings of the two aforementioned components, and consequent increases in the maximum regulated voltage or current output of the power supply.

A further important advantage of a direct-current regulated power supply in accordance with this invention is that well known vibrator stabilization principles may be applied to achieve regulation at the preadjusted level notwithstanding wide variations in ambient temperature, and changes in the characteristics of circuit components due to aging.

One important reason why the prior art did not succeed in producing direct-current, regulated power supplies incorporating these important improvements is because of the common practice of locating the source of reference potential in the circuit so that it is developed within the range of the power-supply output, and usually is of constant magnitude with reference to the power supply output terminal opposite to the one controlled directly by the variable-impedance device. With a circuit arrangement of this type, any adjustment in the level of the regulated output voltage or current will change the magnitude of the voltages and currents to which the error-signal generating circuitry will be subjected. As a result, it is necessary to use very expensive transistors or other circuit components capable of withstanding rather large changes in their operating voltages and currents in order to achieve even a limited degree of adjustability in the level of regulated output current or voltage available from the power supply. Moreover, if it is desired to raise or lower this limited range of adjustability, it is necessary to replace several of the components comprising the circuitry for generating the error signal. This is the case because these components ordinarily are subjected to virtually the entire change in the level of the regulated output.

In contrast, this invention obviates the aforementioned limitations of the prior art by utilizing the power-supply output terminal controlled by the variable-impedance device as the source of reference voltage, developing a constant voltage differing from the reference voltage and outside the range of the power supply output, and then sensing output representative fluctuations from the reference potential developed across the fixed resistance portion of a voltage divider coupled between the point of contact voltage difference and the opposite output terminal of the power supply. Hence, it becomes possible through use of a potentiometer as the other component of the divider to make the aforementioned adjustment of the regulated output voltage or current to any level within a range extending effectively from zero to the upper design limit of the power supply without making any change whatsoever in the components used to develop the error-signal. For the same reason, it becomes comparatively simple to increase the range through which the point of regulation is adjustable. As explained above, this can be done merely by replacing the variable-impedance device and the potentiometer of the divider, with similar components of higher ratings.

The aforementioned advantages of a regulated, direct-current power supply in accordance with this invention also result in an important structural improvement. For example, the fact that the operating conditions of the components comprising the source of constant voltage, and the error-voltage generating circuitry remain constant regardless of the level to which the regulated output voltage or current is adjusted means that less expensive components of more flexible specifications may be utilized. This improvement is a source of an important economy in the production of power supplies incorporating this invention.

A preferred embodiment of this invention includes first and second power input terminals, and first and second load output terminals. A transistor having its collector-emitter circuit coupled between the first power input and the first load output terminals constitutes a controllable, variable-impedance device in series with the power output terminals for regulating load voltage or current in a direction counteracting the effects of fluctuations of load impedance, input voltage, etc. A source of negative potential of constant magnitude, but having a negative value greater than any developed at the load output terminals is comprised of a semiconductor diode coupled in the reverse direction between the first load output terminal and a third input terminal. A resistor and a potentiometer coupled in series in the order named from the constant voltage source to the second load output terminal constitutes a voltage divider for developing an output-representative signal at a circuit point common to the resistor and potentiometer. The error-signal is generated by a two-stage transistorized, differential amplifier having its output terminal coupled to the base of the regulating transistor, and its input terminals coupled, respectively, to the common point of the voltage divider and to the regulated, or reference, output terminal of the power supply. Hence the error signal generated by the amplifier will vary the collector-emitter impedance of the transistor in the direction required to counteract the effects of changes in the input, output, or other operating conditions of the power supply.

In addition, the embodiment described below utilizes input circuitry made up of an input transformer having a single winding primary and a multi-winding secondary. A full-wave rectifier including a capacitive filter circuit is coupled across one winding of the second to provide a source of negative potential for the first input terminal of the power supply, with the source of positive potential for the second input terminal being developed at a center tap of the same winding. A second full-wave rectifier is coupled across another secondary winding to provide a source of unidirectional negative potential for application across the semiconductor diode, and to supply negative biasing potentials for the differential amplifier. A third secondary winding of the input transformer is coupled to a third full-wave rectifier to provide a source of unidirectional positive biasing potential for the differential amplifier.

In accordance with a further important feature of this invention long-term stabilization of the power supply may be achieved through the use of a vibrator-phase detector circuit. This circuit periodically samples the voltage developed across the resistor of the voltage divider, compares its amplitude and polarity to the voltage present at the first, or reference, output terminal of the power supply, amplified any difference signal which results from this comparison, rectifies the amplified difference signal, and detects its phase in order to produce a unidirectional corrective signal for application to the differential amplifier. The corrective signal will have the polarity and magnitude required for minimizing or eliminating the difference signal. As a result, the output voltage or current present at the first and second load terminals of the power supply will be stabilized, notwithstanding the effects of wide fluctuations in ambient temperature or of drift in the operating characteristics of components due to aging.

The foregoing paragraphs are intended to summarize and explain the significance of this invention in relation to the problems which it resolves, and should not be construed to narrow the scope of protection provided by the claims. For a more complete understanding of the structure, operation and novel features of the embodiments of this invention, consider the following description with reference to the drawings, wherein:

FIG. 1 represents schematically the circuit configuration of a typical prior art, regulated, direct-current power supply utilizing a transistor as a variable-impedance device coupled in series with the load across the power supply input terminals, and apparatus including a differential amplifier responsive to the respective input signals from a reference voltage source of constant magnitude and a sample of the instantaneous voltage across the power-supply output terminals to produce an error signal to counteract deviant tendencies of the output voltage or current;

FIG. 2 represents schematically a regulated, direct-current power supply utilizing the same essential functional components represented in FIG. 1, but having an ingenious circuit configuration enabling it to achieve important functional and structural improvements unattainable through use of the prior art circuit configuration of FIG. 1;

FIG. 4 represents schematically a vibrator-phase detector circuit suitable for use with the preferred embodiment of FIG. 3 to insure long-term voltage or current stabilization of the power supply.

Figure 3:
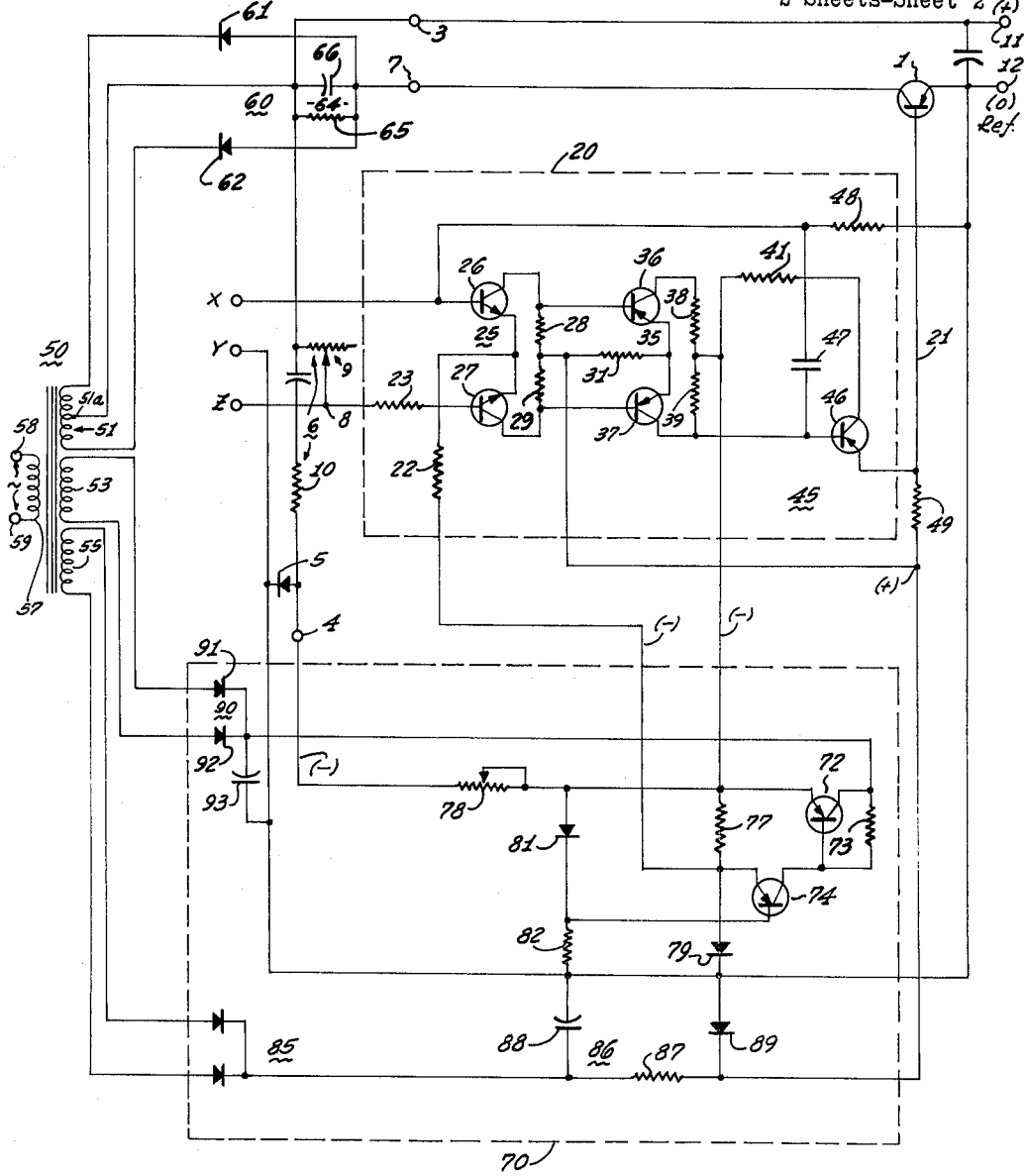
FIG. 3 is a schematic representation of a preferred embodiment of this invention.

The important functional and structural improvements contributed by this invention may be emphasized and understood best by contrasting the prior art power supply represented in FIG. 1 with that of this invention as represented in FIG. 2.

It should be noticed that the essential components of FIGS. 1 and 2 are similar, but the manner in which they are interconnected differs considerably. For example, each power supply utilizes the collector-emitter circuit of a transistor 1 as a variable-impedance device in series with a load 2, and means for producing an error signal made up of an amplifier 20, a low-impedance source of constant voltage in the form of a Zener diode 5 coupled between input terminals 4 and 7, and a voltage divider 6 including a potentiometer 9 and a fixed resistor 10 for sampling the instantaneous power-supply output.

To explain clearly how this invention obviates various operational limitations of prior-art power supplies, the amplifier 20 of FIG. 1 is represented schematically as a differential amplifier comprised of two NPN transistors 13a and 13b having their respective emitters coupled degeneratively to input terminal 7 via resistor 14, and their respective collectors intercoupled via resistors 15 and 16 connected in series. A suitable unidirectional bias voltage of positive polarity for the collectors of transistors 13a and 13b is provided via the voltage-dropping resistor 17 coupled between input terminal 3 and a circuit point common to collector resistors 15 and 16. The reverse-connected semiconductor diode 18 maintains a constant voltage difference between power-supply output terminal 11 and the collector resistors 15 and 16. A resistor 19 is coupled between input terminals 3 and 4 to provide a return path for current passed by the Zener diode 5 in developing a reference voltage of constant magnitude for application to the base of transistor 13a. The input terminal 4 ordinarily is not provided in actual embodiments of the power supply of FIG. 1, and is represented here merely to facilitate a comparison of the prior-art circuit of FIG. 1 with the novel circuit of FIG. 2.

First, consider the functional and structural limitations of the prior art power supply of FIG. 1. In general, a fluctuation in the input voltage applied to terminals 3 and 7, or a variation of the impedance of load 2 results in changes in the power supply output and the voltage developed at the terminal 8 of voltage-divider 6 coupled to one input of the differential amplifier 20. In the amplifier 20, this change in voltage is compared to the reference voltage developed across Zener diode 5, and a unidirectional error voltage of the magnitude and polarity required to counteract the fluctuation in the power-supply output is developed at the output of amplifier 20 and applied to the base of transistor 1 to vary its collector-emitter impedance, and effect output stabilization across the load 2.

The reverse-connected semiconductor diode 18 is necessary to minimize fluctuations in the collector bias applied to amplifier transistors 13a and 13b, and to insure that a sufficient voltage difference of almost constant magnitude will be maintained between the respective bases and the common point of the collector resistors 15 and 16 for any stabilized output level that may be established through an adjustment of potentiometer 9. As a result, the range through which the regulated output level of the power supply may be adjusted is limited to a maximum not exceeding the input voltage less the voltage drop across the diode 18. This limitation, of course, does not exist in the novel circuit configuration of this invention as represented in FIGS. 2 and 3. Likewise, the minimum limit of the range of output adjustment of the power supply of FIG. 1 is the positive reference voltage developed across the Zener diode 5, and this is another limitation obviated by the novel power supply of this invention.

Furthermore, the conventional power supply of FIG. 1 is not adaptable to a wide range of adjustment in the magnitude of its output without replacement of many of the components of the amplifier 20 as well as the potentiometer 9. This limitation exists because the regulating transistor 1 and the components of the amplifier 20 are subjected to voltage differences existing between the output terminals 11 and 12, and the input terminal 3. An inspection of FIG. 1 reveals that changes in the setting of the potentiometer 9 required to adjust the stabilized output level of the power supply result in corresponding changes in the voltages applied to the amplifier 20 and regulating transistor 1. It should be apparent, therefore, that achievement of the widest possible range of preadjustment in the stabilized output of the prior-art power supply of FIG. 1 requires the use of high-quality, relatively-expensive components for the regulating transistor 1, and the amplifier 20. This disadvantage is obviated by the novel circuit configuration of this invention. As will be explained below, an adjustment in the stabilized output level of power supplies embodying this invention may be made to any point within a range extending from zero to a maximum limit equal approximately to the lowest anticipated fluctuation of the power-supply input voltage, and the resulting maximum change in the voltages applied to the regulating transistor 1 and to the differential amplifier 20 will be on the order of a few millivolts. In a conventional power supply like that of FIG. 1 the voltage changes would approximate the change in the setting of the regulated output, and frequently will be on the order of several volts.

As represented in FIG. 2, components like those utilized in the prior-art power supply of FIG. 1 may be combined in an ingenious circuit configuration which wholly obviates the aforementioned limitations, and enables a range of preadjustment of stabilized output voltage from zero to a maximum value approaching the magnitude of the input voltage. In general, a power supply in accordance with this invention has power input terminals 3 and 7, respectively, a reference-voltage input terminal 4, and output terminals 11 and 12 coupled across the load 2. A PNP transistor 1, having its collector-emitter circuit coupled between the power-input and output terminals 7 and 12, respective, constitutes a variable-impedance device in series with the load 2. A Zener diode 5, having its anode coupled to the reference-input terminal 4 and cathode coupled to the reference-output terminal 12 provides a negative voltage of constant magnitude. A voltage divider 6 is formed by resistor 10 and potentiometer 9 coupled in series in the order named from the anode of Zener diode 5 to the conductor 13 interconnecting the input and output terminals 3 and 11, respectively, of the power supply. A differential amplifier 20 utilizes a reference potential input from the reference output terminal 12 of the power supply and derives a control potential from terminal 8 of the voltage divider 6. The output, if any, of the differential amplifier 20 is a unidirectional potential constituting an output error signal of appropriate magnitude and polarity for changing the collector-emitter impedance of the regulating transistor 1 in the direction required to counteract the effect of fluctuations in the power-supply input voltage, the impedance of load 2, or other operating conditions. In essence, the differential amplifiers 20 responds to minute differences between the reference and control potentials which exist simultaneously at the reference output terminal 12 and the terminal 8 of the divider 6 in order to change the impedance of the regulating transistor 1 in the direction required to maintain the output to load 2 at a level preset by the potentiometer 9.

Terminals X, Y, and Z are provided to facilitate a connection to the vibrator-phase detector stabilizing circuit of FIG. 4 if desired.

To understand the operation of the novel power supply represented in FIG. 2, it is important to notice that the Zener diode 5 provides a constant voltage, constant-current source of potential outside the range of the power-supply output voltage, and that the current flow through the resistor 10 of the divider 6 during times when the power-supply output is stable, results in diminution in negative voltage from input terminal 4 of a magnitude equal to that of the constant-voltage developed across Zener diode 5. As a result, the voltage present at this time on terminal 8 of divider 6 will be equal the reference potential present on the reference output terminal 12. Changes in the impedance of load 2, the power supply input, or other operating conditions, will result in corresponding changes in the magnitude of current flowing through the resistor 10, and a consequent increase or decrease in the magnitude of the potential at the terminal 8 relative to that which exists simultaneously on the reference output terminal 12 of the power supply.

As explained already, the differential amplifier 20 responds to the voltage difference between the output terminal 12 and sampling terminal 8 to produce an output error signal for application to the base of the regulating transistor 1 to change its collector-emitter impedance in the direction required to restore the equality of the input voltages to amplifier 20, and, as a consequence, to maintain the stability of the output supplied to the load 2.

Inasmuch as an inherent characteristic of the operation of power supplies in accordance with this invention is that the control potential on the sampling terminal 8 be maintained equal to the potential on the reference output terminal 12 for reasons set forth above, the potentiometer 9 makes it possible to preset the magnitude of the regulated output supplied to load 2 to any level within a range extending from the "zero," or reference, voltage to a maximum equal to rated output voltage of the power supply.

For example, assume that the potentiometer 9 is adjusted to reduce its impedance effectively to zero. As the impedance of the potentiometer 9 diminishes, the control potential at the sampling terminal 8 tends to become more positive. Concurrently, the error signal produced at the output of the amplifier 20 is becoming more positive, in order to increase the collector-emitter impedance of the regulating transistor 1, and decrease the current flowing through load 2. Accordingly the regulated output across the load 2 diminishes, and the positive input terminal 3 is coupled, for all practical purposes, to the sampling terminal 8. As a result, the voltage on the output terminals 11 and 12 is effectively zero. Under these conditions, the potential at the sampling terminal 8 is maintained equal to that of the reference output terminal 12, and virtually the entire voltage drop between the input terminals 3 and 7 occurs across the collector-emitter path of the regulating transistor 1.

From the foregoing description of the structure and operation of the embodiment represented in FIG. 2, it should be noticed that the operating conditions of the amplifier 20, the resistor 10, the Zener diode 5, remain unaffected regardless of any adjustment made in the regulated output level of the power supply. This feature contrasts sharply with the conditions which would exist in a typical prior-art circuit configuration of the type represented in FIG. 1, and is of the utmost significance because it enables the use of relatively inexpensive components for the amplifier 20, and makes possible the adjustment of the regulated power-supply output to any level from zero to maximum output.

The schematic diagram of FIG. 3 represents the circuitry of a preferred embodiment of this invention in the context of an A.-C. to D.-C. regulated power supply. For simplicity, the portions of this embodiment which are functional equivalents of the essential components portrayed in the embodiment of FIG. 2 are given the same reference numerals.

In general, the preferred embodiment of FIG. 3 comprises an input transformer 50 having a first winding 51 of its multi-winding secondary coupled to a full-wave rectifier 60, and returned to the center tap 51a of winding 51, a positive output terminal 11 coupled to the center tap 51a of the secondary winding 51; a reference output terminal 12; a regulating transistor 1 having a collector-emitter circuit coupled between the output of the full-wave rectifier 60 and the reference output terminal 12; a regulated bias-voltage generator 70 deriving its input voltage from the second and third secondary windings 53 and 55 of the input transformer 50 for supplying positive and negative biasing potentials to the differential amplifier 20, a semiconductor Zener-type diode 5 having its cathode coupled to the reference output terminal 12 and its anode coupled to a source of negative potential from the biasing potential generator 70 to provide a low impedance, constant-current source of constant voltage; a voltage divider 6 made up of a resistor 10 and a potentiometer 9 coupled in series in the order named from the anode of the Zener diode 5 to the positive output terminal 11 of the power supply; and a two-stage transistorized differential amplifier 20 having an output conductor 21 coupled to the base of the regulating transistor 1, a first input coupled via resistor 48 to the reference output terminal 12, and a second input coupled to terminal 8 of the voltage divider 6.

The input transformer 50 has a primary winding 57 provided with input terminals 58-59 coupled to a source (not shown) of unregulated alternating-current voltage, and three secondary windings 51, 53 and 55. The voltage developed across the first secondary winding 51 is coupled to the full-wave rectifier 60 in order to produce the unidirectional output voltage of the power supply. The voltage developed across secondary winding 51 is rectified by the semiconductor rectifiers 61 and 62 to produce a negative potential across the capacitive filter 64 comprised of capacitor 66 coupled in parallel with resistor 65 between the anodes of the semiconductor rectifiers 61 and 62 and the center tap 51a of the secondary winding 51. The positive output terminal 11 of the power supply is coupled directly to the center tap 51a of secondary winding 51.

The second and third secondary windings 53 and 55 supply power to the bias-potential generator 70.

The bias-potential generator 70 generally comprises a transistor 72 connected so that its collector-emitter circuit will operate as a controllable and variable impedance to stabilize the negative voltage derived from the second secondary winding 53 of the input transformer 50; and a transistor amplifier 74 connected in the common emitter configuration, with its collector coupled to the base of the voltage-stabilizer transistor 72 and its emitter coupled via a voltage-dropping resistor 77 to the emitter of the voltage stabilizer transistor 72. Any voltage fluctuations occurring at the latter terminal are developed across resistor 82, and are coupled to the base of transistor 74 via semiconductor diode 81. These fluctuations will be amplified and applied, in turn, to the base of voltage-stabilizing transistor 72 in order to adjust its collector-emitter impedance in the direction required to counteract the fluctuations. A suitable load for transistor 74 is provided by resistor 73.

In addition, the bias-potential generator 70 also includes a source of positive bias potential made up of the full-wave rectifier 85 coupled across the third secondary winding 55 of input transformer 50, a capacitive filter 86 comprised of capacitor 88 in parallel with resistor 87, and a voltage regulator comprised of a Zener-type semiconductor diode 89 having its cathode coupled via the resistor 87 to the full-wave rectifier 85, and its anode coupled to the reference output terminal 12 of the power supply. The capacitor 88 of the filter 86 is coupled between the output of the full-wave rectifier 85 and the reference output terminal 11 of the power supply. The stabilized positive bias potential developed across the semiconductor diode 89 is utilized for biasing transistors of the differential amplifier 20.

For developing regulated biasing potentials for the differential amplifier 20 and the source of constant magnitude negative potential provided by the Zener diode 5, the bias-potential generator 70 includes a full-wave rectifier 90 formed by semiconductor diodes 91 and 92 coupled in series across the secondary winding 53 of the input transformer 50. The unregulated pulsations of the negative voltage developed by the full-wave rectifier 90 are smoothed by the capacitor 93 coupled between the reference terminal 12 of the power supply and the output of full-wave rectifier 90. The unregulated negative potential of rectifier 90 is coupled to the reference output terminal 12 through a circuit including the controllable-impedance collector-emitter path of the voltage-stabilizing transistor 72, variable resistor 78, and the constant-magnitude source of negative potential provided by the Zener-type, semi-conductor diode 5.

A first regulated negative-biasing potential for use by the differential amplifier 20 is developed across resistor 77 and semiconductor diode 79 coupled in series in the order named from the emitter of the stabilizing transistor 72 to the reference output terminal 12. The semiconductor diode 79 is of the Zener type, and provides a source of negative biasing potential for the emitter of the transistor amplifier 74.

A second regulated negative biasing potential of somewhat lower magnitude than that provided by the first is developed across the semiconductor diode 79, and, like the first, is utilized in the differential amplifier 20. A suitable negative biasing potential for the base of the transistor amplifier 74 is developed across the Zener-type semiconductor diode 81 coupled in series with the resistor 82 in the order named from the emitter of the voltage-stabilizing transistor 72 to the power-supply reference terminal 12. The variable resistor 78 makes it possible to pre-set the magnitude of the current flow through the sources of constant negative potential formed by Zener diode 5 for optimum temperature stability.

The negative biasing potentials developed by the bias-potential generator 70 are regulated by the voltage stabilizing transistor 72, the transistor amplified 74, and associated circuitry. Assume, for example, that the magnitude of the alternating-current voltage developed across secondary winding 53 of the input transformer 50 tends to diminish. This will cause the unidirectional negative potential developed by the full-wave rectifier 90 likewise to diminish. These effects must be compensated by a corresponding diminution in the collector-emitter impedance of the voltage-stabilizing transistor 72. This change in the impedance of the stabilizing transistor 72 is effected by a resulting reduction in the current through the semiconductor diode 81 and the resistor 82. As this current tends to diminish, the potential developed across resistor 82 becomes less negative. This results in a diminution of the usual negative potential present on the base of the transistor amplifier 74. As a result, the decreased flow of current through the collector-to-emitter path of the transistor amplifier 74 causes the base of the voltage-stabilizing transistor 72 to become more negative. This has the effect of reducing the collector-emitter impedance of the stabilizing transistor 72 sufficiently to maintain the current and voltage of its emitter at a constant magnitude.

The differential amplifier 20 includes a first differential stage of amplification 25 comprising the NPN transistors 26 and 27, a second differential stage of amplification 35 comprising the PNP transistors 36 and 37, and a single stage output amplifier 45 comprised of PNP transistor 46. As explained already, the principal function of the differential amplifier 20 is to develop an error signal having the amplitude and polarity required to change the collector-emitter impedance of the regulating transistor 1 in the direction required to counteract any change in the voltage developed across the power supply output terminals 11 and 12.

In the first stage 25 of the differential amplifier 20 the respective emitters of the NPN transistors 26 and 27 are interconnected directly, and are biased to a negative potential from the bias-potential generator 70 via the voltage-dropping resistor 22. The base of the NPN transistor 26 is coupled via the resistor 48 to the reference output terminal 12. The input to the base of the transistor 27 is obtained via the voltage-dropping resistor 23 from the output-voltage sampling terminal 8 on the wiper arm of the output-voltage adjusting potentiometer 9. The positive output signals developed by the first stage 25 are developed across the load resistors 28 and 29 coupled in series between the respective collectors of the NPN transistors 26 and 27. The positive biasing potential for the collectors of the first stage 25, supplied by the bias-potential generator 70, is coupled to a terminal common to the load resistors 28 and 29.

In the second stage 35 of the differential amplifier, the respective emitters of the PNP transistors 36 and 37 are interconnected directly, and are supplied with positive biasing potential from diode 89 via the resistor 31. The respective output signals from the first stage 25 are coupled directly to the respective bases of transistors 36 and 37 of the second stage 35. The respective collectors of the PNP transistors 36 and 37 are biased via load resistors 38 and 39 at an appropriate negative potential developed at the emitter of transistor 72.

The output stage 45 of the differential amplifier 20 is comprised of the PNP transistor 46 coupled in the emitter-follower configuration. The input signal applied to the base of the output stage 45 is derived directly from the output of transistor 37 of the second stage 35, and the collector of transistor 46 is biased to an appropriate negative potential from the bias-potential generator 70 via resistor 41. The resulting error signal, if any, produced on the emitter of transistor 46 is developed across the resistor 49 which is coupled between the source of positive bias potential in generator 70 and the base of the regulating transistor 1. The capacitor 47, coupled between the base of transistor 46 and the base of transistor 26 prevents oscillations from occurring.

The terminals X, Y, and Z, coupled respectively to the base of transistor 26, the power supply output reference terminal 12, and the base of transistor 27, are coupled to corresponding X, Y and Z terminals of the vibrator-phase detector stabilizing circuit to be described below in connection with FIG. 4.

The operation of the preferred embodiment represented in FIG. 3 is the same as that described above with reference to the simplified schematic of FIG. 2. Restated briefly, a diminution of the output voltage present at output terminals 11 and 12 will be represented as a corresponding tendency of the voltage present at the sampling terminal 8 to diminish, and become negative with respect to the potential present at the reference output terminal 12 constituting the input signal to the transistor 26 of the first differential amplifier stage 25. The negative-going potential at the sampling terminal 8 is supplied as an input to the base of the other transistor 27 of the first differential amplifier stage. Accordingly, the collector current of transistor 27 decreases, and this, in turn, drives the base of the transistor 37 of the second differential amplifier stage 35 more positive. This diminishes the collector current of transistor 37, and has the effect of making the base of output transistor 46 of the output stage 45 more negative. As a consequence, more current tends to flow through the emitter of the output transistor 46, and this, in turn, increases the negative potential applied to the base of the regulating transistor 1. The effect of the increased negative potential on the base of the regulating transistor 1 is to reduce the impedance of its collector-emitter circuit to an extent which prevents the power supply output at terminals 11 and 12 from dropping in response to the reduced A.-C. input voltage.

The schematic of FIG. 4 represents a vibrator-phase detector suitable for use with embodiments of this invention to provide stabilization over long periods, notwithstanding the effects of component aging, and wide fluctuations of ambient operating temperatures. This circuit is comprised of an amplifier 100 having an uneven number of amplifying stages and a single-pole, two contact vibrator 110. The input to the amplifier 100 is coupled via capacitor 102 to the contact 111 of the vibrator 110, and also to the sampling terminal of the power supply via the voltage-dropping resistor 104 and terminal Z. The vibrating element 113 of the vibrator 110 is coupled via terminal Y to the reference output terminal 12 of the power supply. The output of the amplifier 100 is coupled to the contact 112 of vibrator 110 where it is subjected to phase-sensitive rectification. The rectified output signal developed on the vibrating element 113 of the vibrator 110 is coupled via the resistance-capacitance filter 106 and terminal X to the base of transistor 26 in the first stage 25 of the differential amplifier 20 to effect a change, in the manner already described, in the collector-emitter impedance of the regulating transistor 1 in the direction required to maintain the power-supply output at terminals 11 and 12 at the pre-set level.

For example, assume that a decrease in the impedance of a load coupled between output terminals 11 and 12 tends to reduce the power-supply output voltage. This will tend to make the potential at the sampling terminal 8 negative with respect to the potential at the reference output terminal 12. Thus, whenever the vibrating element 113 of the vibrator 110 oscillates away from contact 111 a negative potential will be applied via terminal Z, resistor 104, and capacitor 102 to the input of the amplifier 100. On the other hand, when the vibrating element 113 swings against the contact 111 of the vibrator 110, the input to amplifier 100 is restored momentarily to the reference potential present at terminal Y. Repetitive oscillations of the vibrating element 113 result in a square-wave input signal 107 to amplifier 100. It should be noticed that the effect of the coupling capacitor 102 is to make the waveform 107 symmetrical about a D.-C. reference level.

The amplifier 100 then increases the amplitude and inverts the phase of the error signal 107. Accordingly, when the vibrating element 113 of the vibrator 110 oscillates against the contact 112 a portion of the output signal corresponding to the positive half cycle of the input waveform 107 is integrated by the filter 106 and applied to the base of the transistor 26 in the first differential amplifier stage 25. In the manner already explained, this change in the potential on the base of transistor 26 has the effect of developing the error signal required to reduce the collector-emitter impedance of regulating transistor 1 sufficiently to overcome the effect of the diminished load impedance on the voltage developed at output terminals 11 and 12.

It should be noticed that if the impedance of a load coupled between the power-supply output terminals 11 and 12 had increased rather than diminished as assumed above, the effect would have been to produce a positive potential at the sampling terminal 8 and at terminal Z of the vibrator-stabilizing circuit relative to the reference potential present at the reference output terminal 12. Under these conditions, a waveform 109 opposite in phase to the waveform 107 would be developed at the input of amplifier 100, and the vibrator-stabilizing circuit would function as already described to minimize or eliminate any resulting fluctuation in the power-supply output.

It should be apparent, of course, that transistors of the NPN type may be used in lieu of PNP transistors, and vice versa, provided that the biasing and signal polarities of the replaced transistors are reversed.

The representations made in the drawings and the description are intended merely to facilitate the practice of this invention, not to restrict its scope. Moreover, it is obvious that many circuit variations may be made with respect to the disclosed embodiment while remaining within the boundaries of this invention as established by the following claims.

I claim:
1. A direct-current power supply for providing a voltage of a regulated value, including,
   means for providing an input voltage;
   power supply output terminals;
   an input terminal connected to receive a voltage different from the input voltage;
   a variable impedance device coupled in series with the output terminals and the voltage means and having an input element for controlling the variable impedance in response to an error signal and having a control element connected to one of the output terminals for providing a reference potential;
   means coupled to the control element of the variable impedance device and the one output terminal and the input terminal and responsive to the potential difference between the one output terminal and the input terminal for producing a unidirectional potential of substantially constant magnitude with respect to the reference potential and outside the range relative to the reference potential of any output voltage produced by the power supply;
   means coupled between the producing means and the other of the output terminals for developing a unidirectional potential having a magnitude and polarity equal to that present on the one output terminal whenever the power supply voltage is at the regulated value and having a polarity and magnitude, with respect to the potential of the one output terminal, indicative of the magnitude and direction of fluctuations of the power supply voltage from the regulated value, and
   means coupled to the one output terminal, to the developing means and to the input element of the variable impedance and responsive to the reference and unidirectional potentials device for providing an error signal having a polarity and magnitude required to change the impedance of the variable impedance device sufficiently to counteract fluctuations and stabilize the power supply voltage at the regulated value.

2. In a direct-current power supply for producing a regulated voltage within particular limits, first and second power input terminals for respectively receiving first and second input potentials, a third input terminal for a unidirectional voltage, the third input terminal being outside the particular limits of the voltage from the power supply and being connected to receive a different potential than the first and second input potentials, first and second output terminals, means coupled between the first input and first output terminals for regulating an electrical component of voltage present on the output terminals in response to an error signal, and means coupled to the third input terminal, the first output terminal and the regulating means for developing the error signal in response to a reference potential and a unidirectional potential representing fluctuations of the regulated component, and means for producing the reference and unidirectional potentials, said last mentioned means including:
   means coupled between the third input terminal and the first output terminal for providing the reference voltage of constant magnitude, and
   a voltage divider network having first and second terminals coupled effectively between the second output terminal and the third input terminal to facilitate the production of the reference potential at the first output terminal and including a terminal electrically intermediate the first and second terminals of the voltage divider network for developing the unidirectional potential.

3. In a direct-current power supply for producing a regulated voltage within particular limits, first and second power input terminals for respectively receiving first and second input potentials, a third input terminal for a unidirectional voltage outside the particular limits of the voltage from the power supply, the third input terminal being connected to receive a potential different from the first and second input potentials, first and second output terminals, means coupled between the first input and first output terminals for regulating an electrical component of voltage present on the output terminals in response to an error signal, and means coupled to the third input terminal, the first output terminal and the regulating means for developing the error signal in response to a reference potential and to a unidirectional potential representing fluctuations of the regulated component, and means for producing the reference and unidirectional potentials, said last mentioned means including:
   a semi-conductor diode having forward and reverse directions and coupled in the reverse direction between the first output and third input terminals to develop the reference potential; and
   a divider network having first and second terminals coupled between the second output terminal and the third input terminal to facilitate the production of the reference voltage at the first output terminal, the divider network having a third terminal electrically intermediate the first and second terminals of the divider network to obtain the production of the unidirectional potential at the third terminal of the divider network.

4. The apparatus set forth in claim 3 wherein the voltage divider network includes a variable resistance and a fixed resistance in series and wherein the third terminal of the voltage divider network is common to the variable resistance and the fixed resistance.

5. A direct-current power supply for producing a regulated voltage, including:
    two power input and two power output terminals, the two power input terminals being respectively connected to receive first and second input potentials;
    a third input terminal connected to receive a different potential than the first and second input potentials;
    means coupled between one of the power input terminals and one of the power output terminals and responsive to an input signal for regulating the magnitude of the voltage available at the power output terminals;
    means coupled between the third input terminal and the one power output terminal and responsive to the potential difference between these terminals for producing a voltage of constant magnitude outside the limits of the regulated output voltage;
    a voltage divider having first and second terminals in series between the third input terminal and the other of the two power output terminals and having a terminal intermediate the first and second terminals for producing a control potential; and
    means having a first input terminal coupled to the one output terminal and having a second input terminal coupled to the intermediate terminal of the voltage divider and having an error-signal output terminal coupled to the regulating means and responsive to the reference and control potentials for developing an error signal and for introducing the error signal to the regulating means to obtain a regulating action by the regulating means in accordance with the characteristics of the error signal.

6. A direct-current power supply for producing a regulated voltage having upper and lower limits, including:
    two power input and two power output terminals, the two power input terminals being respectively connected to receive first and second input potentials;
    a third input terminal connected to receive a different potential than the first and second input potentials;
    means coupled between one of the power input terminals and one of the power output terminals and responsive to an error signal for regulating the magnitude of the voltage available at the power output terminals;
    a semi-conductor diode having forward and reverse directions and coupled in the reverse direction between the one output terminal and responsive to the potential difference between these terminals, and the third input terminal for producing a voltage of constant magnitude outside the upper and lower limits of the output voltage;
    a voltage divider having first and second terminals in series between the two power output terminals and having a terminal intermediate the first and second terminals for producing a control potential, and
    means having a first input terminal coupled to the one output terminal, having a second input terminal coupled to the intermediate terminal of the voltage divider and having an error-signal output terminal coupled to the regulating means and responsive to the voltage of constant magnitude and the control potential for producing an error signal in accordance with differences in the voltages introduced to its first and second input terminals and for introducing the error signal to the regulating means for obtaining a regulation of the voltage available at the power output terminals.

7. A direct-current power supply having a stable output voltage adjustable to any value within a particular range, including:
    two power input and two power output terminals, the two power input terminals being respectively connected to receive first and second input potentials;
    a third input terminal connected to receive a potential different from the first and second input potentials;
    means coupled between one of the power input terminals and one of the power output terminals and responsive to an error signal for regulating the magnitude of the voltage available at the power output terminals;
    means coupled between the third input terminal and the one power output terminal and responsive to the potential difference between these terminals for producing a voltage of constant magnitude outside the particular range of the regulated output voltage;
    a resistor and a potentiometer connected in series between the third input terminal and the other of the two power output terminals and having an intermediate terminal common to the resistor and the potentiometer for producing a control potential, and
    means having a first input terminal coupled to the one output terminal, having a second input terminal coupled to the intermediate terminal common to the resistor and the potentiometer and having an error-signal output terminal coupled to the regulating means and responsive to the reference and control potentials for producing an error signal having characteristics dependent upon any differences between the voltages on its two input terminals and for obtaining an introduction of the error signal to the regulating means to obtain a regulation of the magnitude of the voltage available at the power output terminals.

8. A direct-current power supply having a stable output voltage adjustable to any value within a particular range, including:
    two power input and two power output terminals, the two power input terminals being respectively connected to produce first and second input potentials;
    a third input terminal connected to receive a potential different from the first and second input potentials;
    means coupled between one of the power input terminals and responsive to an error signal for regulating nals and one of the power output terminals and responsive to an error signal for regulating the magnitude of the voltage available at the power output terminals;
    means including a reverse-connected semi-conductor diode coupled between the third input terminal and the one power output terminal and responsive to the potential difference between these terminals for producing a voltage of constant magnitude outside the particular range of the regulated output voltage;
    a fixed resistor and a variable resistor having first and second terminals connected in series between the other output terminal and the third input terminal and having a terminal intermediate the first and second terminals for producing a control potential; and
    means having a first input terminal coupled to the one output terminal, having a second input terminal coupled to the terminal common to the fixed resistor and the variable resistor and having an error-signal output terminal coupled to the regulating means and responsive to the voltage of constant magnitude and the control potential for producing an error signal having characteristics dependent upon any differences between the voltages on its two input terminals and for obtaining an introduction of the error signal to the regulating means to obtain a regulation of the magnitude of the voltage available at the power output terminals.

9. A direct-current power supply for producing a regulated voltage within particular limits, including:
    power supply input terminals respectively connected to receive first and second input voltages;
    power supply output terminals;
    a third input terminal connected to receive a voltage outside the particular limits of the output voltage produced by the power supply and different from the first and second input voltages;

a variable impedance device connected in series with the power supply input terminals and the output terminals and having an input element for controlling the variable impedance of the device in response to an error signal;

a Zener diode coupled between the third input terminal and the variable impedance device and one of the output terminals for producing a constant potential difference between the input terminal and the one output terminal;

a voltage divider having first and second terminals and having a terminal intermediate the first and second terminals for producing a control potential and having the first and second terminals coupled between the input terminal and the other output terminal; and a differential amplifier having a first input terminal coupled to the one output terminal, having a second input terminal coupled to the intermediate terminal of the voltage divider and having an error signal output terminal coupled to the input element of the variable impedance device and responsive to the constant potential difference and the control potential for developing an error signal in accordance with any differences in the voltages on its two input terminals and for introducing the error signal to the input element of the variable impedance device to obtain a control over the operation of the variable impedance device in accordance with the characteristics of the error signal.

10. A direct-current power supply for producing a regulated voltage within particular limits, including:

power supply input terminals respectively connected to receive first and second input potentials;

power supply output terminals;

a third input terminal connected to receive a potential different from the first and second input potentials;

a variable impedance device coupled in series with the output terminals and the power supply input terminals and having an input element for controlling the variable impedance of the device in response to an error signal;

means coupled to the variable impedance device and one of the output terminals and the third input terminal for producing a unidirectional potential of constant magnitude with respect to the one output terminal and outside the particular limits of the output voltage produced by the power supply;

means coupled between the producing means and the other of the output terminals for developing a unidirectional control potential equal to that present on the one output terminal upon the production of the regulated voltage by the power supply output and having a polarity and magnitude, with respect to the potential of the one output terminal, indicative of the magnitude and direction of any fluctuations of the regulated voltage from the power supply; and means coupled to the one output terminal, to the developing means, and to the input element of the variable impedance device and responsive to the unidirectional potential of constant magnitude and the unidirectional control potential for providing an error signal having a magnitude required to change the impedance of the device sufficiently to counteract fluctuations and stabilize the power supply output at the regulated magnitude and for introducing the error signal to the input element of the variable impedance device.

11. A direct-current power supply for producing a regulated voltage within particular limits, including:

power supply output terminals;

a variable impedance device coupled in series with the output terminals and having an input element for controlling the variable impedance of the device in response to an error signal;

means coupled to the variable impedance device and one of the output terminals for producing a unidirectional potential of constant magnitude with respect to the one output terminal and outside the particular limits of the output voltage produced by the power supply;

means coupled between the producing means and the other of the output terminals for developing a control potential equal to that present on the one output terminal upon the production of the regulated voltage by the power supply output and having a polarity and magnitude, with respect to the potential of the one output terminal, indicative of thte magnitude and direction of any fluctuations of the regulated voltage from the power supply;

means coupled to the one output terminal, to the developing means, and to the input element of the variable impedance device and responsive to the unidirectional potential of constant magnitude and to the control potential for providing an error signal having a magnitude required to change the impedance of the device sufficiently to counteract fluctuations and stabilize the power supply output at the regulated magnitude and for introducing the error signal to the input element of the variable impedance device; and means for stabilizing the power supply output notwithstanding the effects of component aging and wide fluctuations in ambient temperature, and including further means coupled respectively to the one output terminal, to the developing means, and to the providing means for sampling alternately the voltage potentials present on the one output terminal and the developing means and generating a unidirectional correction signal representing the direction and magnitude of any difference between the voltage potentials for application to the providing means.

12. A direct-current power supply for producing a regulated voltage within particular limits, including:

power supply output terminals;

an input terminal for a source of potential outside the particular limits of the output voltage produced by the power supply;

a variable impedance device coupled in series with the output terminals and having an input element for controlling the variable impedance of the device in response to an error signal;

a Zener diode coupled between the input terminal and the variable impedance device and one of the output terminals for producing a constant potential difference between the input terminal and the one output terminal;

a voltage divider having first and second terminals and having a terminal intermediate the first and second terminals for developing a control potential and having its first and second terminals coupled between the input terminal and the other output terminal;

a differential amplifier having a first input terminal coupled to the one output terminal, having a second input terminal coupled to the intermediate terminal of the voltage divider and having an error signal output terminal coupled to the input element of the variable impedance device and responsive to the constant potential difference and to the control potential for introducing an error signal to the variable impedance device for controlling the impedance of the variable impedance device;

a vibrator having an oscillating element coupled to the one output terminal, having a first switch contact in cooperative relation with the oscillating element and coupled to the intermediate terminal of the voltage divider and having a second switch contact in cooperative relation with the oscillating element;

a phase-inverting amplifier having an input conductor coupled to the first switch contact of the vibrator and having an output conductor coupled to the second switch contact of the vibrator; and means coupled to the second switch contact of the vibrator and to the first input terminal of the differential amplifier for eliminating unidirectional pulsations from the output of the phase-inverting amplifier.

13. In a direct-current power supply for providing a regulated voltage within particular limits, first and second power input terminals respectively connected to receive first and second input potentials, a third input terminal connected to receive a unidirectional voltage outside the particular limits of the regulated voltage from the power supply and different from the first and second input potentials, first and second output terminals, means coupled between the first input and first output terminals for regulating an electrical component of voltage present on the output terminals in response to an error signal, and means coupled to the third input terminal, the first output terminal and the regulating means for developing the error signal in response to a control potential and to a unidirectional potential representing fluctuations of the regulated component, and means for producing the unidirectional potential, said means including:

a reverse-connected semi-conductor diode coupled between the third input and first output terminals and responsive to the potential difference between these terminals, and a voltage divider network including at least a pair of impedances and having first and second terminals coupled effectively between the second output terminal and the third input terminal and including a third terminal for the unidirectional potential where the third terminal of the voltage divider network is intermediate the first and second terminals of the voltage divider network and where the third terminal produces the control potential.

14. The power supply set forth in claim 5, including, means coupled to the one output terminal, to the developing means and to the voltage divider for sampling alternately the voltage on the one output terminal and the developing means to generate a unidirectional correction signal representing the direction and magnitude of any difference between the voltages on the one output terminal and the developing means and for introducing the unidirectional correction signal to the voltage divider.

15. The power supply set forth in claim 8, including means coupled to the one output terminal, to the error signal means and to the fixed resistor and the variable resistor for sampling alternately the voltage potential on the one output terminal and the developing means to generate a unidirectional correction signal representing the polarity and magnitude of any difference between the voltages on the one output terminal and the developing means and for introducing the correction signal to the fixed resistor and the variable resistor.

References Cited by the Examiner

UNITED STATES PATENTS

| | | | |
|---|---|---|---|
| 2,731,591 | 1/1956 | Kiltie | 321—16 |
| 2,915,693 | 12/1959 | Harrison | 323—22 |
| 3,068,392 | 12/1962 | Santelmann | 321—18 |
| 3,072,842 | 1/1963 | Vaughn | 323—22 |
| 3,109,979 | 11/1963 | Faulkner et al. | 323—22 |
| 3,113,260 | 12/1963 | Wiley | 323—22 |

LLOYD McCOLLUM, *Primary Examiner.*

G. P. HAAS, D. L. RAE, K. D. MOORE,
*Assistant Examiners.*